Figure 1:
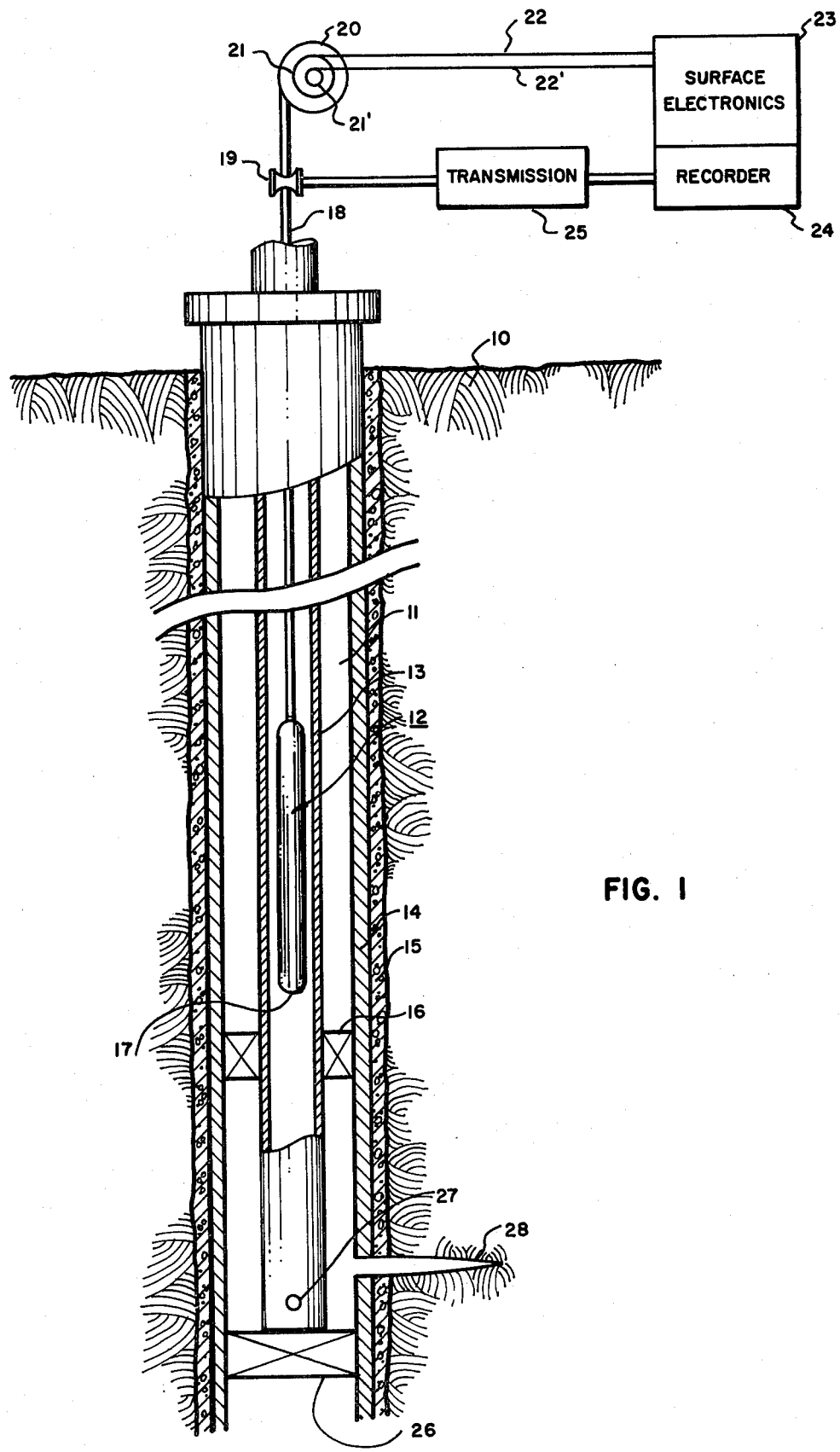

United States Patent [19]

Fertl

[11] 4,178,506
[45] Dec. 11, 1979

[54] METHOD FOR DETECTING FRACTURES IN FORMATIONS SURROUNDING EARTH BOREHOLES

[75] Inventor: Walter H. Fertl, Houston, Tex.

[73] Assignee: Dresser Industries, Inc., Dallas, Tex.

[21] Appl. No.: 830,554

[22] Filed: Sep. 6, 1977

[51] Int. Cl.$^2$ .............................................. G01V 5/00
[52] U.S. Cl. .................................................. 250/260
[58] Field of Search ............... 250/258, 259, 260, 269, 250/303

[56] References Cited

U.S. PATENT DOCUMENTS

| 3,748,474 | 7/1973 | Murphy | 250/259 |
| 3,825,752 | 7/1974 | Murphy et al. | 250/259 |
| 4,052,613 | 10/1977 | Murphy et al. | 250/259 |

Primary Examiner—Alfred E. Smith
Assistant Examiner—Janice A. Howell
Attorney, Agent, or Firm—Albert M. Crowder, Jr.

[57] ABSTRACT

Well is first logged with gamma ray detection system to provide a base log. Fluid containing salt of potassium, uranium or thorium is then injected into the well opposite the interval of interest. When the well head pressure is increased, some of the injected fluid will move into the fracture or other highly permeable localized zones. The gamma ray detection system is then run again one or more times through the well to provide a log which is compared with the base log. The fracture is detected by localized drastically higher readings observed on the repeat run of the gamma ray detection logging system.

6 Claims, 4 Drawing Figures

METHOD FOR DETECTING FRACTURES IN FORMATIONS SURROUNDING EARTH BOREHOLES

BACKGROUND OF THE INVENTION

This invention relates generally to well logging methods for investigating the subsurface earth formations traversed by a borehole and, more specifically, relates to an improved method for detecting fractures and other highly permeable localized zones.

It is well known in the art of well logging to inject radioactivity tracers and to log the movement of the tracer material throughout the formations and behind the casing to provide an indication of fractures, highly permeable zones, and fluid channels behind the cement which holds the casing in place. Examples of such tracer materials are described in U.S. Pat. No. 3,600,582 to Arthur H. Youmans and assigned to the assignee of the present application. In such prior art methods utilizing radioactive tracers, the tracer material can be one of several, for example, cadmium 109. Another example of such a radioactive tracer is tritium. However, such radioactive tracers are dangerous and require special precautions and governmental permits to transport, handle and use them in the oilfield. Furthermore, such tracer materials can present obvious environmental problems.

It is also well known in the art of well logging to use gamma ray detection systems to perform spectral analysis, for example, as described in U.S. Pat. No. 3,940,610 to Charles L. Dennis et al. With a system described therein, a gamma ray detector provides a measurement of the total natural gamma radiation occurring within the borehole and three energy band selectors discriminate this measurement of the gamma ray detector into potassium, uranium, and thorium energy band signals centered about the energy levels at which potassium, uranium and thorium exhibit peak gamma radiation intensities.

It is therefore one of the primary objects of the present invention to provide a new and improved method for conducting a well logging survey which detects fractures and highly permeable localized zones in earth formations surrounding a borehole.

The objects of the invention are accomplished, generally, by first logging the well, injecting the well with a natural tracer material and then re-logging the well to follow the path of the injected fluid.

Figure 2:
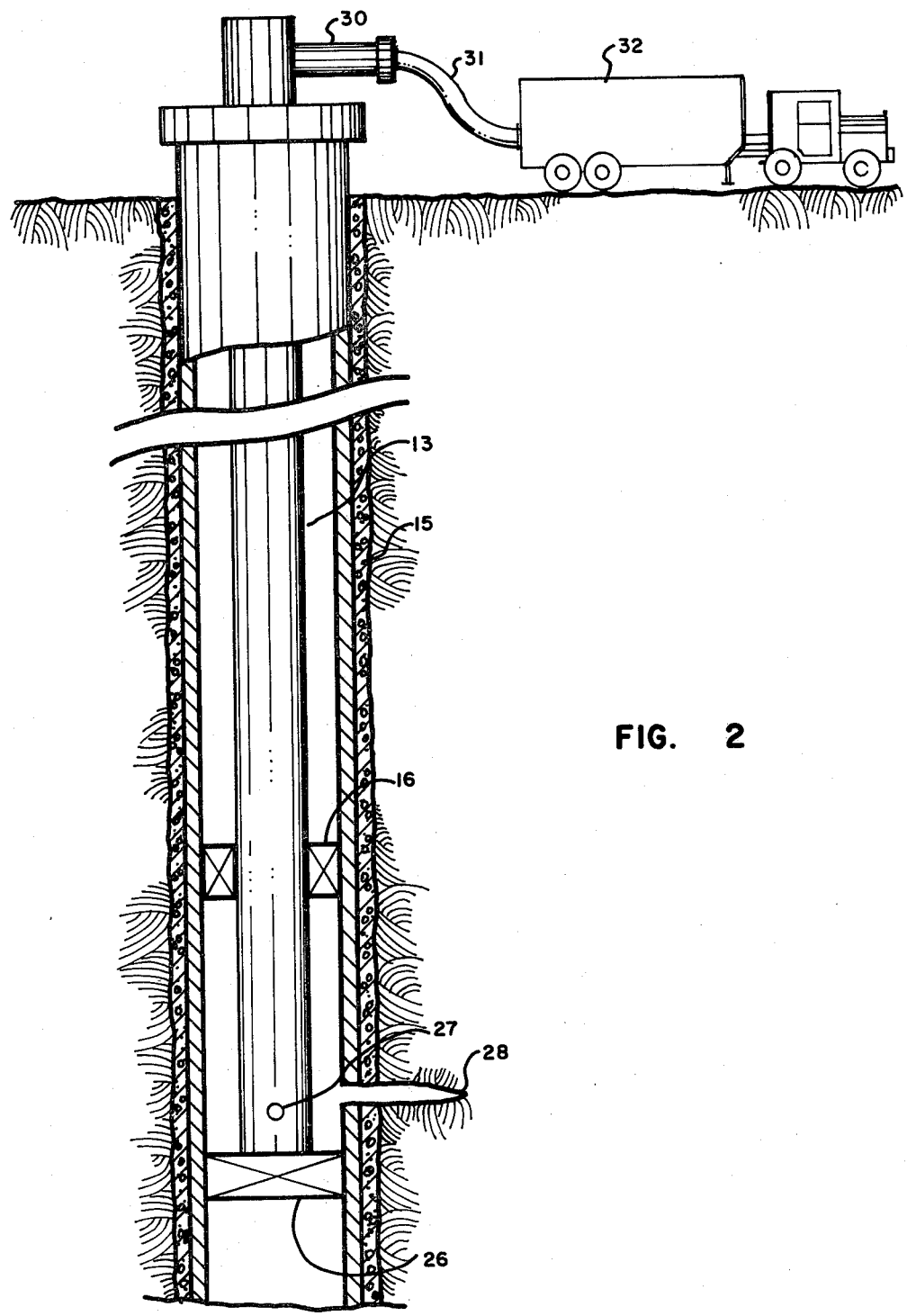
Figure 3:
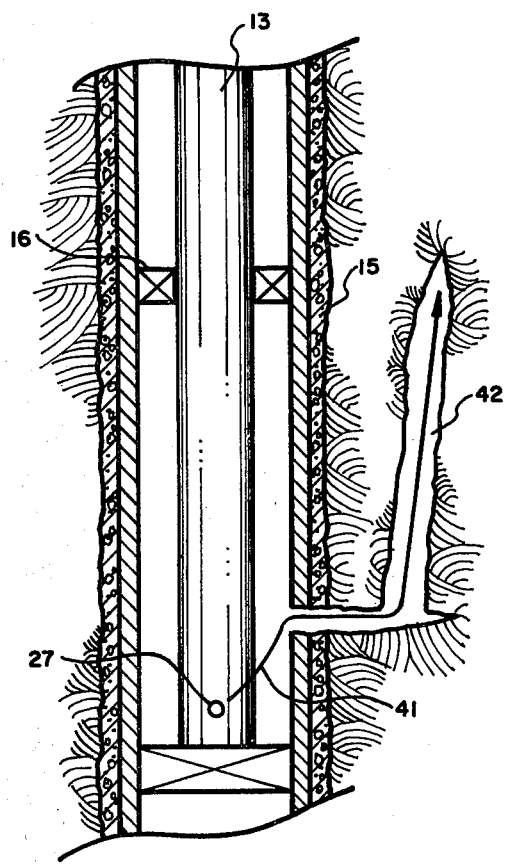
Figure 4:
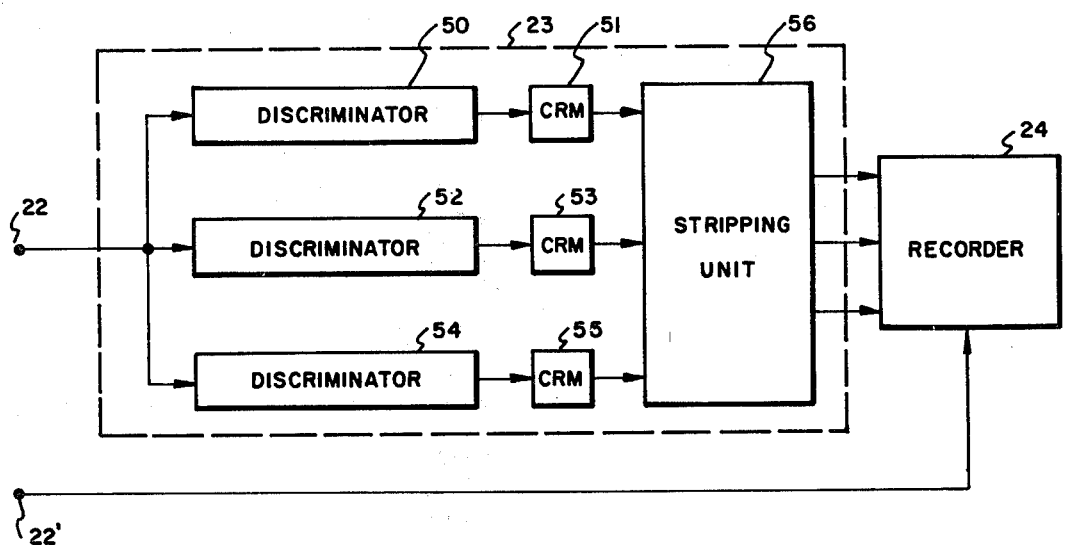

These and other objects, features and advantages of the present invention will be more readily appreciated from a reading of the following detailed specification and drawing, in which:

FIG. 1 is a side elevation, partly in cross section, of a borehole logging instrument in operative position and its associated surface circuitry and related equipment;

FIG. 2 schematically illustrates, partly in cross section, the ulilization of a pumping truck for injecting fluid into the borehole and adjacent formation of interest in accordance with the present invention;

FIG. 3 schematically illustrates the path of the injected fluid from the lower end of the tubing through the perforation into a fracture in the earth formation; and FIG. 4 illustrates in block diagram representative electronics used with the well logging instrument in accordance with the present invention.

Referring now to the drawing in more detail, especially to FIG. 1, there is illustrated schematically a radioactivity well surveying operation in which a portion of the earth 10 is shown in vertical section. A well 11 penetrates the earth's surface and is cased by a steel casing 14 in a conventional manner. A string of tubing 13 communicates the lower portion of the cased borehole with the earth's surface and through which oil or gas is allowed to flow from a producing zone to the earth's surface. A well logging instrument 12 is suspended inside the tubing by a cable 18 which contains the required conductors for electrically connecting the instrument with the surface apparatus. The cable 18 is wound on or unwound from the drum 20 in raising and lowering the instrument 12 to traverse the well. Disposed within the instrument 12 is a gamma ray detection system well known in the art, for example, as illustrated and described within U.S. Pat. No. 3,940,610. The well logging cable 18 passes over the measuring sheath 19 which is connected through a transmission 25 to a surface recorder 24 so that the recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and provide adequate space within it to house the necessary apparatus and permit the transmission of radiation through it. The subsurface signals are processed with any necessary subsurface electronics (not illustrated) and also by the surface electronics 23. The signals passing along the cable 18 are taken off the slip rings 21 and 21', and are sent to the surface electronics 23 by means of the conductors 22 and 22', respectively.

Also disclosed within the well bore is a packer 16 and a packer 26, both of which are conventional in the art. The lower end of the tubing has one or more ports 27 which will allow fluid injected from the top of the tubing to pass out into the borehole, the purpose of which will be explained in greater detail hereinafter. A perforation 28 perforates the casing 14 and the cement sheath 15 and passes on into the formation of interest in a manner well known in the art of perforating earth boreholes.

The instrument 12 contains a gamma ray detection system which is conventional in the art and which provides spectral analysis of the detected gamma rays based upon their respective energy levels. Of the many elements that naturally occur in earth formations, potassium, uranium, and thorium are important natural sources of gamma radiation. Each of these elements either contains or radioactively decays to, radioactive isotopes which emit gamma radiation at characteristic energy levels. The natural gamma ray spectrum of a given formation therefore exhibits peaks of intensities at energies corresponding to the potassium, uranium, and thorium content of the formation. As will be explained in greater detail hereinafter, the instrument 12 is caused to traverse the interior of the tubing 13 to provide a spectral analysis of the formations of interest.

Referring now to FIG. 2, there is illustrated the same well as was illustrated in FIG. 1 but which has a connection 30 made to the tubing 13 so that a hose 31 connected to a pump truck 32 can pump or inject fluid into the tubing 13. In the operation of the system illustrated in FIG. 2, but which will be described in greater detail hereinafter, the pump truck 32 pumps or injects fluid into the top of the tubing 13 and out through the one or more perforations 28 into the earth formation of interest. As is well known in the art, the packers 16 and 26 will prevent the pumped fluid from passing above the packer 16 or below the packer 26 and thus necessarily confine the injected fluid to the space between the packers and to the formation of interest which has been perforated by the perforation 28.

Referring now to FIG. 3, a vertical fracture 42 is shown in communication with the perforation. The fluid path 41 indicates the path of the injected fluid out through the one or more ports 27, through the perforation and up through the fracture 42.

In the method according to the present invention, the well logging instrument 12 illustrated in FIG. 1 is run through the tubing and a base log is conducted which performs a spectral analysis of the zone of interest, i.e., primarily those zones which would be located between the packer 16 and the packer 26 illustrated in FIG. 3. The well logging instrument 12 is then preferably removed from the tubing but can be left in the tubing if desired. The pump truck 32 is hooked up to the connector 30 by means of the hose 31 and a slug of injection fluid containing potassium salts, for example, KCl, is injected out through the one or more ports 27 and the perforation 28 into the fracture as the pumping pressure is increased. After the potassium salt has been deposited within the fracture 42, the well logging instrument 12 is again caused to traverse the zones of interest and the potassium chloride will cause gamma rays to be detected by the well logging instrument to provide a profile of the fracture 42.

FIG. 4 illustrates in block diagram a portion of the surface electronics 23 illustrated in FIG. 1. It should be appreciated that the circuitry of FIG. 4 is completely disclosed within U.S. Pat. No. 3,940,610 and it is intended that the entire disclosure of that patent be incorporated herein by reference. However, it should be appreciated that the conductor 22 from the cable 18 is connected to the input of the three discriminators 50, 52 and 54 whose outputs are connected to the count rate meters 51, 53 and 55, respectively. The outputs of the count rate meters 51, 53 and 55 are connected to a stripping unit 56 whose outputs are recorded on the recorder 24. The conductor 22' can be connected to a conventional casing collar locator located within the well logging instrument 12 and its output recorded on the recorder 24. Typical energy bands for the discriminators 50, 52 and 54 are those which pass, respectively, the 1.76 Mev peak for uranium, the 2.62 Mev peak for thorium and the 1.46 Mev peak of potassium.

Although the preferred embodiment of the present invention contemplates the use of a system such as that embodied within U.S. Pat. No. 3,940,610, those skilled in the art will recognize that a simpler detection system can be utilized if desired. For example, since the preferred embodiment contemplates the use of a potassium salt as the injected fluid, the detecting system need only be responsive to potassium and need not concern itself with uranium and thorium and the stripping circuits used within U.S. Pat. No. 3,940,610. Those skilled in the art will also recognize that instead of using a potassium salt, salts of uranium and thorium can also be used as the injected material and still be within the inventive concepts herein described wherein the dangerous radioactive tracers are not utilized. Furthermore, although the illustrated embodiment relates to a fracture, whether naturally occurring or induced, the invention can also be used to delineate drastic localized permeability variations. It should also be appreciated that the method is applicable in production or injection wells in various formations, including sandstone reservoirs and massive carbonate sections. Furthermore, while the preferred embodiment contemplates using the method in cased boreholes, it is also applicable to uncased holes as well.

The embodiments of the invention in which an exclusive property or privilege is claimed are defined as follows:

1. A method for locating a fracture in earth formations, comprising:
   traversing an earth borehole with a gamma ray detection system, thereby creating a base log;
   injecting a fluid containing a salt from the group consisting of potassium, thorium and uranium salts into the formation of interest; and
   thereafter traversing the said earth borehole with said gamma ray detection system, thereby creating a second log indicative of a profile of said fracture.

2. The method according to claim 1 wherein said fluid contains KCl.

3. A method for locating a fracture in earth formations, comprising:
   traversing an earth borehole with a gamma ray detection system sensitive to potassium, thereby creating a base log;
   injecting a fluid containing potassium chloride into the formation of interest; and
   thereafter traversing the said earth borehole with said gamma ray detection system, thereby creating a second log indicative of a profile of said fracture.

4. A method for locating a localized highly permeable zone in earth formations, comprising:
   traversing an earth borehole with a gamma ray detection system, thereby creating a base log;
   injecting a fluid containing a salt from the group consisting of potassium, thorium and uranium salts into the formation of interest; and
   thereafter traversing the said earth borehole with said gamma ray detection system, thereby creating a second log indicative of the said highly permeable zone.

5. The method according to claim 4 wherein said fluid contains KCl.

6. A method for locating a localized highly permeable zone in earth formations, comprising:
   traversing an earth borehole with a gamma ray detection system sensitive to potassium, thereby creating a base log;
   injecting a fluid containing potassium chloride into the formation of interest; and
   thereafter traversing the said earth borehole with said gamma ray detection system, thereby creating a second log indicative of the said highly permeable zone.

* * * * *